(12) United States Patent
Ito

(10) Patent No.: US 6,691,412 B2
(45) Date of Patent: Feb. 17, 2004

(54) HOSE-CONNECTOR ASSEMBLY INCLUDING OUTER RUBBER PROTECTOR TUBE WHICH COVERS ENTIRE LENGTH OF INNER RESIN TUBE, AND METHOD OF PRODUCING THE SAME

(75) Inventor: Takashi Ito, Komaki (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/104,126

(22) Filed: Mar. 22, 2002

(65) Prior Publication Data

US 2002/0100999 A1 Aug. 1, 2002

Related U.S. Application Data

(62) Division of application No. 09/476,248, filed on Dec. 30, 1999, now Pat. No. 6,409,225.

(51) Int. Cl.[7] .............................................. F16L 35/00
(52) U.S. Cl. ...................... 29/890.144; 29/505; 29/516; 285/222.1
(58) Field of Search ..................... 29/890.144, 412, 29/417, 447, 452, 505, 506, 512, 516, 527.2, 458, 525.13; 285/222.1, 222.2–222.5, 226, 238, 239, 256, 319

(56) References Cited

U.S. PATENT DOCUMENTS

| 2,073,909 | A | * | 3/1937 | Stecher | 29/505 |
|---|---|---|---|---|---|
| 2,172,532 | A | * | 9/1939 | Fentress | 29/890.144 |
| 4,500,485 | A | | 2/1985 | Willemsen et al. | |
| 4,664,423 | A | * | 5/1987 | Rowley | 29/447 |
| 4,907,625 | A | | 3/1990 | Ito et al. | |
| 5,348,779 | A | | 9/1994 | Igarashi | |
| 5,354,107 | A | * | 10/1994 | Takikawa | 285/328 |
| 5,419,028 | A | * | 5/1995 | Manning et al. | 29/417 |
| 5,430,929 | A | * | 7/1995 | Sanders | 29/890.144 |
| 5,588,469 | A | | 12/1996 | Kakiuchi et al. | |
| 5,622,210 | A | | 4/1997 | Crisman et al. | |
| 5,829,483 | A | | 11/1998 | Tukahara et al. | |
| 5,884,671 | A | | 3/1999 | Noone et al. | |
| 6,189,199 | B1 | * | 2/2001 | Ouchi et al. | 29/890.144 |
| 6,279,966 | B1 | | 8/2001 | Kondo et al. | |

FOREIGN PATENT DOCUMENTS

| JP | 09178065 A | * | 7/1997 |
| JP | 9-217877 | | 8/1997 |
| JP | 11141755 A | * | 5/1999 |

* cited by examiner

Primary Examiner—Gregory Vidovich
Assistant Examiner—Jermie E. Cozart
(74) Attorney, Agent, or Firm—Burr & Brown

(57) ABSTRACT

A method of producing a hose-connector assembly, including the steps of forming by extrusion an inner resin tube layer, forming by extrusion an outer rubber protector tube layer having substantially the same length as the inner resin tube layer, so as to cover the outer surface of the inner resin tube layer over the entire length of the inner resin tube layer, to obtain a laminar tubular blank consisting of the inner resin tube layer and the outer rubber protector tube layer, cutting the laminar tubular blank into pieces, and press-fitting an end portion of a tubular connector in each of at least one of the opposite end portions of the inner resin tube.

5 Claims, 3 Drawing Sheets

HOSE-CONNECTOR ASSEMBLY INCLUDING OUTER RUBBER PROTECTOR TUBE WHICH COVERS ENTIRE LENGTH OF INNER RESIN TUBE, AND METHOD OF PRODUCING THE SAME

CROSS REFERENCE TO RELATED APPLICATION

This application is a division and claims the benefit of U.S. application Ser. No. 09/476,248 filed Dec. 30, 1999 now U.S. Pat. No. 6,409,225 the entirety of which is incorporated herein by reference.

BACKGROUND OF THE INVENTION

1. Field of the Invention

The present invention relates to a hose-connector assembly used for fuel transportation or other purposes in automotive vehicles; which assembly includes a hose with an outer protector tube and a connector. This invention is also concerned with a method of producing such a hose-connector assembly.

2. Discussion of the Related Art

A hose made of a rubber material has been conventionally used as a fuel transporting hose for automotive vehicles. Recently, however, there is a growing tendency of using a resin tube such as a tube made of nylon or other hard resin material, which has high gasoline impermeability and which is less expensive than a rubber hose. This tendency of using a resin tube in place of a rubber hose applies to an air hose and hoses having other applications in automotive vehicles.

The hose using a resin tube is required to be protected against an external mechanical impact or heat, by an outer rubber protector tube or layer which covers the inner resin tube. For instance, the outer rubber protector tube is made of ethylene propylene rubber or other EP rubber material which has high degrees of weather and heat resistances. In particular, the outer rubber protector tube is essential for the fuel transporting hose, in order to reduce the heat transfer to the fuel within the resin tube, upon generation of a flame for some reason or other.

For installing the fuel transporting hose, for example, on an automotive vehicle, a tubular connector is partly press-fitted into one or both of the opposite end portions of the hose, so that a pipe or other member is connected to each connector. Typically, a tubular connector of a so-called "single-action engagement" type is generally used, for permitting easy, quick connection of the pipe or other member to the hose, with a single action of pushing the pipe into the end portion of the hose.

An example of the recently developed, widely used hose-connector assembly for fuel transportation or other purposes used for automotive vehicles is illustrated in FIG. 4. This hose-connector assembly includes an inner resin tube 1, an outer rubber protector tube 2 which covers the outer surface of the inner resin tube, and a tubular connector 3 which is inserted at one end thereof into each of the opposite end portions of the resin tube 1 so that a suitable member is connectable to the connector 3 at the other end.

The known hose-connector assembly shown in FIG. 4 is produced by preparing the resin tube 1 and the rubber protector tube 2 separately from each other, and press-fitting the rubber protector tube 2 onto the outer circumferential surface of the inner resin tube 1. This manner of assembling the resin tube 1 and the rubber protector tube 2 into the hose inevitably causes the opposite end portions of the inner resin tube 1 to extend from the opposite ends of the rubber protector tube 2. This tendency is remarkable particularly where the resin tube 1 is a bent tube. In this case, a relatively large clearance or gap is likely to be present between each end portion of the rubber protector tube 2 and the outer surface of the inner resin tube 1.

Thus, each end portion 1a of the resin tube 1 of the known hose-connector assembly is exposed, and is not covered and protected by the outer rubber protector tube 2. The exposed end portion 1a is relatively likely to be overheated and damaged in a short time upon generation of a flame near the exposed end portion 1a, for instance. Accordingly, the rubber protector tube 2 cannot serve its assigned function of protecting the resin tube 1 against heat or flame from which the fuel flowing in the resin tube 1 must be isolated.

Another problem with the known hose-connector assembly is that it is difficult to securely attach the tubular connector 3 at its nipple portion 3a to the corresponding end portion of the hose 1, 2, since the end portion 1a of the resin tube 1 is exposed and is not covered by the corresponding end portion of the rubber protector tube 2. Namely, the hose cannot be held with a suitable clamping tool being fitted on the outer surface of the end portion of the rubber protector tube 2 when the nipple portion 3a is press-fitted into the exposed end portion 1a of the resin tube 1, so that the exposed end portion 1a of the resin tube 1 tends to be easily buckled upon press-fitting of the nipple portion 3a into the exposed end portion 1a, which is not externally supported by the outer rubber protector tube 2.

A static electricity may be generated due to a friction between the fuel and the resin tube 1 in which the fuel flows. To avoid the generation of a spark due to the static electricity, it is required that the static electricity be discharged from the resin tube 1 through a pipe (usually a metallic male member) to which the tubular connector 3 in the form of a male member is connected.

To meet the above requirement, the tubular connector 3 is required to be made of a metallic material or an electrically conductive resin material, while the resin tube 1 to which the connector 3 is connected is required to be electrically conductive. On the other hand, however, the resin tube 1 is required to have a high degree of gasoline impermeability, and is therefore difficult to be made solely of an electrically conductive resin. That is, the resin tube 1 is required to include not only an inner layer of an electrically conductive resin such as electrically conductive ETFE (copolymer of ethylene and tetrafluoroethylene), but also an outer layer made of nylon, for example. This results in an increase in the cost of manufacture of the fuel transporting hose.

SUMMARY OF THE INVENTION

It is therefore a first object of the present invention to provide a relatively inexpensive hose-connector assembly having an inner resin tube and an outer rubber protective tube and a tubular connector, which assembly has sufficiently high degrees of weather and heat resistances and which are less likely to be buckled upon press-fitting of the connector to the resin tube.

An optional object of the invention is to provide a hose-connector assembly which permits static electricity to be discharged from the resin tube through the connector.

A second object of this invention is to provide a method suitable for producing such a hose-connector assembly.

The first object may be achieved according to a first aspect of this invention, which provides a hose-connector assembly comprising an inner resin tube having an outer circumferential surface and opposite end portions, an outer rubber protector tube which covers an outer circumferential surface of the inner resin tube over an entire length of the inner resin tube, and a tubular connector having opposite end portions one of which is press-fitted in each of at least one of opposite end portions of the inner resin tube.

In the hose-connector assembly of the present invention constructed as described above, the outer circumferential surface of the inner resin tube is covered and protected by the outer rubber protector tube, over the entire length of the inner resin tube, so that the hose exhibits increased degrees of heat and weather resistances even at the opposite end portions of the inner resin tube. In particular, the end portions of the inner resin tube covered by the outer rubber protector tube are highly protected from a flame possibly generated near the end portions of the resin tube, where the hose-connector assembly is used on an automotive vehicle, for instance.

The present hose-connector assembly wherein the end portions of the inner resin tube are externally protected by the end portions of the outer rubber protector tube has another advantage that the hose can be held by a suitable clamping tool fitted on the outer surface of the end portion of the outer rubber protector tube when the end portion of the tubular connector is press-fitted into the end portion of the inner resin tube. Accordingly, the end portion of the inner resin tube will not be buckled when the connector is attached to the end portion of the resin tube.

The end face of the end portion of the outer rubber protector tube which corresponds to the above-indicated one end portion of the tubular connector may be substantially flush with the end face of the corresponding end portion of the inner resin tube in a longitudinal direction of said tubes. In this case, the outer circumferential surface of the inner resin tube and the inner circumferential surface of the outer rubber protector tube may be bonded together by an adhesive agent.

Alternatively, the end portion of the outer rubber protector tube which corresponds to the above-indicated one end portion of the tubular connector may extend beyond the end face of the corresponding end portion of the inner resin tube in a direction toward a retainer portion of the tubular connector, so that the above-indicated one end portion of the outer rubber protector tube is held in contact with the outer circumferential surface of the tubular connector. In this instance, the outer rubber protector tube may be formed on the outer circumferential surface of the inner resin tube in the absence of an adhesive agent therebetween.

Where the outer rubber protector tube has an end portion extending from the end face of the corresponding end portion of the inner resin tube, it is preferable that at least the tubular connector, and preferably both of the tubular connector and the outer rubber protector tube be electrically conductive or include an electrically conductive portion. In this case, static electricity generated by the inner resin tube may be discharged through the electrically conductive connector to a member which is to be connected to the hose through the connector. This arrangement, which achieves the optional object of the invention indicated above, assures improved safety of the hose-connector assembly during its use, without using the resin tube including an electrically conductive layer, which increases the cost of manufacture of the hose. However, the inner resin tube may include such an electrically conductive layer, such as an electrically conductive nylon or ETFE inner layer.

The second object indicated above may be achieved according to a second aspect of this invention, which provides a method of producing a hose-connector assembly of the present invention constructed as described above, the method comprising the steps of: forming by extrusion an inner resin tube layer having a length sufficient to provide a plurality of inner resin tubes; forming by extrusion an outer rubber protector tube layer having substantially the same length as the inner resin tube layer, using an unvulcanized rubber material, such that an outer circumferential surface of the inner resin tube layer is covered by the outer rubber protector tube layer over an entire length of the inner resin tube layer, to obtain a laminar tubular blank consisting of the inner resin tube layer and the outer rubber protector tube layer; cutting the laminar tubular blank into pieces each of which provides a hose consisting of the inner resin tube and the outer rubber protector tube; and press-fitting the above-indicated one end portion of the tubular connector in each of at least one of the opposite end portions of the inner resin tube.

In the present method, the hose consisting of the inner resin tube and the outer rubber protector tube is prepared by cutting the laminar tubular blank obtained by forming by extrusion the inner resin tube layer and the outer rubber protector tube layer such that the outer circumferential surface of the inner resin layer tube is covered by the outer rubber protector tube layer over the entire length of the inner resin tube layer. Accordingly, the inner resin tube of the hose is covered by the outer rubber protector tube over the entire length of the inner resin tube. Therefore, the hose-connector assembly including the hose has substantially the same advantages as described above with respect to the hose-connector assembly.

The unvulcanized rubber material of the outer rubber protector tube layer may be subjected to a vulcanization process, before the laminar tubular blank including the vulcanized outer rubber protector tube layer is cut into pieces. Alternatively, the unvulcanized rubber material of a rubber protector tube portion of each of the pieces which have been obtained by cutting the laminar tubular blank may be subjected to a vulcanization process.

When the above-indicated one end portion of the tubular connector is press-fitted in each of at least one of the opposite end portions of the inner resin tube, the inside diameter of each of at least one of the opposite end portions of the inner resin tube may be increased.

The hose may be given a desired curved configuration by softening the hose by heating thereof before or after the above-indicated one end portion of the tubular connector is press-fitted in each of at least one of the opposite end portions of the inner resin tube.

The outer circumferential surface of the inner resin tube layer may be coated with an adhesive agent, so that an inner circumferential surface of the outer rubber protector tube layer is bonded with the adhesive agent to the outer circumferential surface of the inner resin tube layer, so as to assure that an end portion of the outer rubber protector tube which corresponds to the above-indicated one end portion of the tubular connector is substantially flush with that of the corresponding end portion of the inner resin tube in a longitudinal direction of the tubes.

The outer rubber protector tube layer may be formed by extrusion on the outer circumferential surface of the inner resin tube layer, in the absence of an adhesive agent on the outer circumferential surface of the inner resin tube layer, so that an end portion of the outer rubber protector tube which corresponds to the above-indicated one end portion of the tubular connector extends beyond an end face of the corresponding end portion of the inner resin tube in a direction toward the other end portion of the tubular connector, as a result of relative movement of the inner resin tube and the outer rubber protector tube while the end portion of the tubular connector is press-fitted in each of at least one of the opposite end portions of the inner resin tube.

BRIEF DESCRIPTION OF THE DRAWINGS

The above and other objects, features, advantages and technical and industrial significance of this invention will be better understood and appreciated by the following detailed description of presently preferred embodiments of the invention, when considered in connection with the accompanying drawings, in which.

DETAILED DESCRIPTION OF THE PREFERRED EMBODIMENTS

Figure 1:
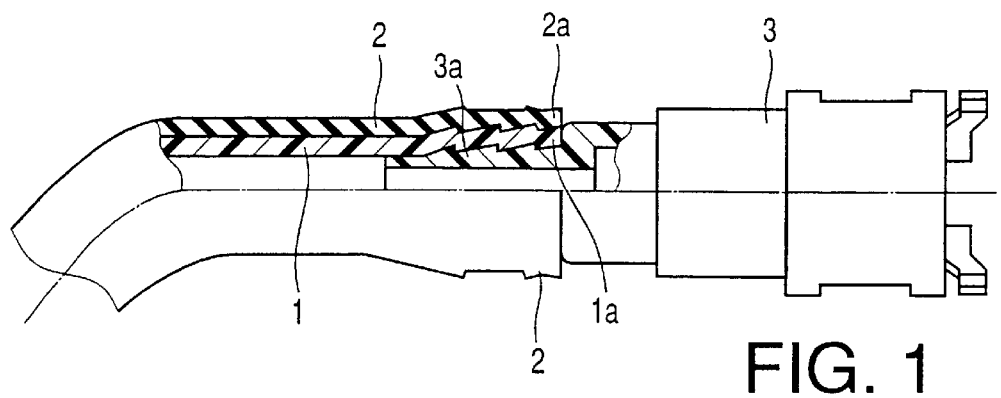
FIG. 1 is a fragmentary side elevational view partly in cross section schematically showing a hose-connector assembly including a resin tube covered by an outer rubber protector tube, which is constructed according to one embodiment of this invention.

Referring first to FIG. 1, there is shown a hose-connector assembly constructed according to a first embodiment of this invention. The hose-connector assembly consists of a hose and two tubular connectors 3. In FIG. 1, there is shown only one of the two connectors 3 which corresponds to one of the opposite end portions of the hose. The hose consists of an inner resin tube 1 having a cylindrical wall having a constant thickness and a constant diameter, and an outer rubber protector tube 2 which also has a cylindrical wall having a constant thickness and constant diameter. The outer rubber protector tube 2 covers the entire outer circumferential surface of the resin tube 1 over the entire axial length of the resin tube 1. Namely, the rubber protector tube 2 covers and protects not only an intermediate portion of the resin tube 1, but also opposite end portions 1a of the resin tube 1 to which the respective connectors 3 are fixed as described below. Accordingly, the rubber protector tube 2 assures improved heat and weather resistances of the hose of the hose-connector assembly, in particular, an improved degree of protection of the resin tube 1 against a flame, and therefore an improved degree of protection of a fuel against a flame, where the hose-connector assembly is used for transporting the fuel. Further, each end portion 1a of the resin tube 1 is covered and supported by the corresponding end portion 2a of the outer rubber protector tube 2, so that the tubular connector 3 can be press-fitted at its hose joint portion 3a into the corresponding end portion 1a of the resin tube 1, without buckling of the end portion 1a, so that the connector 3 can be relatively easily fixed to the hose 1, 2, using a suitable clamping tool in the form of a band, for example, which is fitted on the outer circumferential surface of the end portion 2a of the rubber protector tube 2.

Figure 2:
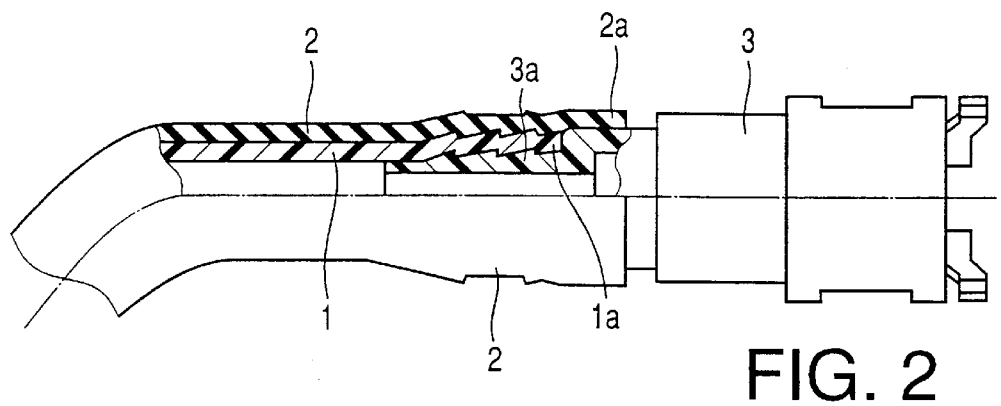
FIG. 2 is a fragmentary side elevational view partly in cross section schematically showing a hose-connector assembly constructed according to another embodiment of the invention.
Figure 3:
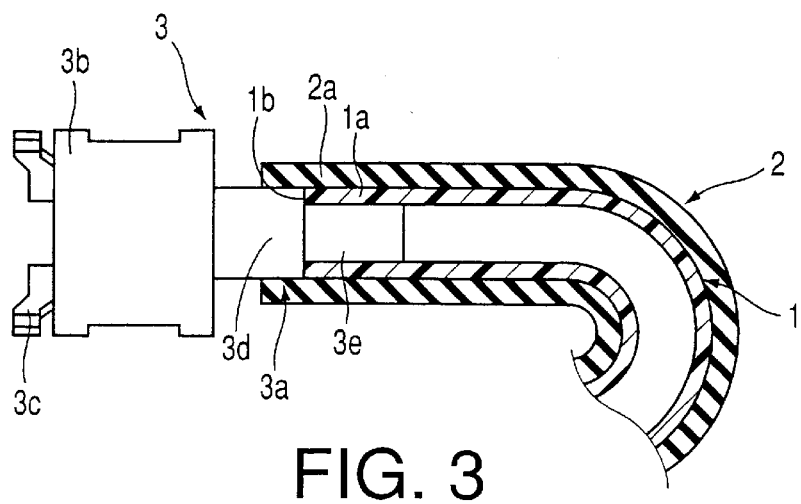
FIG. 3 is an enlarged view showing the hose-connector assembly of FIG. 2.

Referring next to FIGS. 2 and 3, there is shown a hose-connector assembly constructed according to a second embodiment of this invention. In this hose-connector assembly, each end portion 2a of the outer rubber protector tube 2 extends beyond the corresponding end face 1b of the inner resin tube 1 in the direction toward a cylindrical retainer portion 3b of the tubular connector 3, such that the end portion 2a is held in contact with the outer circumferential surface of a cylindrical hose joint portion 3a of the connector 3. The retainer portion 3b has a retainer 3c for holding an end portion of a metallic fuel pipe, for example, within the housing of the retainer portion 3b. The hose joint portion 3a coaxially extends from one end face of the retainer portion 3b, and includes an intermediate portion 3d extending from the end face of the retainer portion 3b remote from the retainer 3c, and a nipple portion 3e which extends from the end face of the large-diameter portion 3d and which has a smaller diameter than the intermediate portion 3d.

The end portion 2a of the outer rubber protector tube 2 is held in contact with the outer circumferential surface of the intermediate portion 3d of the hose joint portion 3a of the tubular connector 3, while the corresponding end portion 1a of the inner resin tube 1 is held in contact with the outer circumferential surface of the nipple portion 3e of the hose joint portion 3a. This arrangement permits an improved degree of protection of the inner resin tube 1 by the outer rubber protector tube 2. In this embodiment, the protector tube 2 is made of an electrically conductive rubber material, and each tubular connector 3 is made of a metallic material, or a resin material containing a powdered carbon material. According to this arrangement, a static electricity generated by the resin tube 1 can be suitably discharged or escaped through the electrically conductive rubber protector tube 2 and the electrically conductive connector 3 to a suitable member such as a metallic pipe to which the connector 3 is connected. This arrangement does not require the inner resin tube 1 to include an electrically conductive layer, which would inevitably increase the cost of manufacture of the inner resin tube 1.

Figure 5:
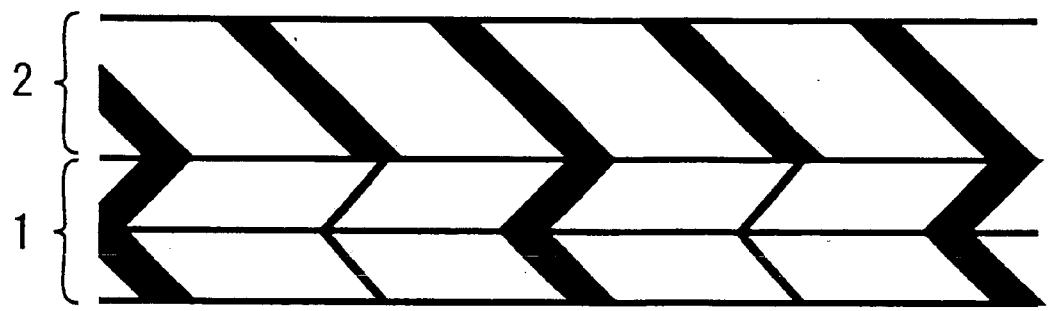
FIG. 5 is a cross sectional view of a part of a hose constructed according to still another embodiment of the invention.
Figure 6:
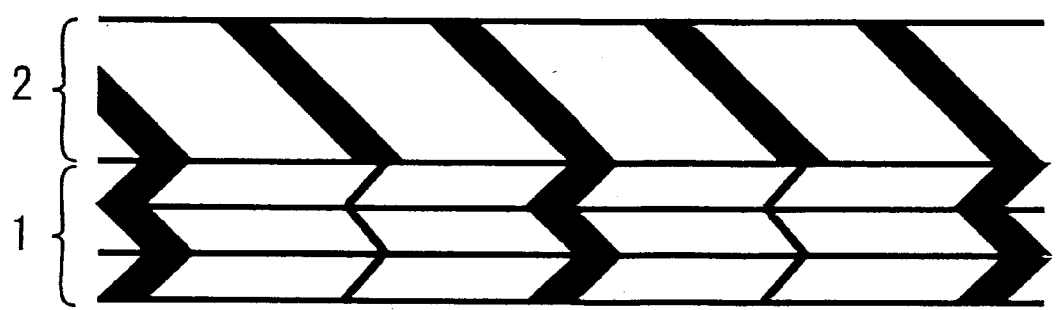
FIG. 6 is a cross sectional view of a part of a hose constructed according to yet another embodiment of the invention.

The inner resin tube 1 used in the above embodiments may be formed of a resin material conventionally used for hoses for automotive vehicles. Preferably, the resin tube 1 is formed of nylon, for example, where the hose-connector assembly is used for transporting a fuel. The resin tube 1 may consist of a single nylon layer, as shown in FIGS. 2 and 3, or a plurality of layers including a nylon layer and an ETFE layer, as shown in FIGS. 5 and 6. The nylon layer or the ETFE layer may be an electrically conductive inner layer which contacts the fluid flowing in the resin tube 1. Generally, the resin tube 1 has an inside diameter of about 4–18 mm, and a wall thickness of about 0.5–2 mm.

The outer rubber protector tube 2 is preferably formed of a rubber material having high degrees of weather and heat resistances, such as ethylene propylene rubber or other EP rubber material (EPDM, EPM, etc.), or chloroprene rubber. Generally, the rubber protector tube 2 has a wall thickness of about 0.3–3 mm. The tubular connectors 3 may be any type of conventionally used connector made of a resin or metal, such as a "quick engagement" or "single-action engagement" connector. The material of the connectors 3 may contain an electrically conductive. material such as a carbon powder dispersed therein.

The hose-connector shown in FIG. 1 may be produced in the following manner.

Initially, a resin tube layer having a length sufficient to provide a plurality of resin tubes 1 is formed by extrusion of an extrudable thermoplastic material, and a rubber protector tube layer having the same length as the resin tube layer is formed by extrusion of an uncured or unvulcanized rubber material, on the outer circumferential surface of the resin tube layer, so that a laminar tubular blank consisting of the inner resin tube layer and the outer rubber protector tube layer is obtained. Before the rubber protector tube layer is formed on the inner resin tube layer, the outer circumferential surface of the resin tube layer is coated with a suitable adhesive or bonding agent for bonding the two tube layers together. Then, the rubber material of the outer rubber protector tube layer of the laminar tubular blank is fully or partially vulcanized, and the laminar tubular blank is cut into pieces each of which has a desired length and provides the hose consisting of the inner resin tube 1 and the outer rubber protector tube 2. Alternatively, the laminar tubular blank is first cut into pieces, each of which is subsequently subjected to a vulcanization process to fully or partially vulcanize the rubber material of the rubber protector tube portion of the piece, to eventually obtain the hose 1, 2.

Figure 4:
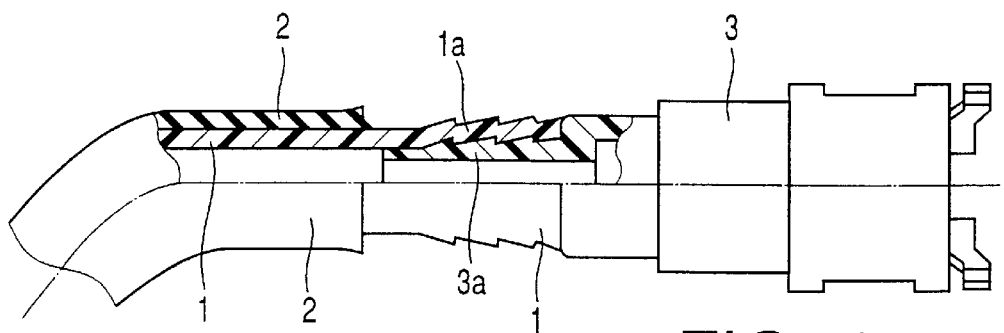
FIG. 4 is a fragmentary side elevational view schematically showing a conventional hose-connector assembly.

In the hose thus formed, the inner resin tube 1 and the outer rubber protector tube 2 have the same length, with the opposite end faces of the resin tube 1 being substantially flush with the corresponding end faces of the rubber protector tube 2, in the longitudinal direction of the hose, as indicated in FIG. 1. In this respect, the hose produced according to the present invention is different from the conventional hose shown in FIG. 4 wherein the inner resin tube 1 has the exposed end portions 1a not covered by the outer rubber protector tube 2. The rubber protector tube 2 which has been fully or partially vulcanized provides desired degrees of weather and heat resistances, and is capable of maintaining a desired wall thickness even after the hose is subsequently subjected to a bending process.

Then, the hose joint portion 3a of the tubular connector 3 is press-fitted into each of the opposite end portions 1a of the inner resin tube 1 of the hose, as shown in FIG. 1. To facilitate the press-fitting of the hose joint portion 3a in each end portion 1a, the end portion 1a of the resin tube 1 is preferably subjected to a flaring operation to increase its inside diameter. Since the resin tube 1 and the rubber protector tube 2 are bonded together by an adhesive agent or layer interposed therebetween, the inner resin tube 1 is not moved relative to the outer rubber protector tube 2 when the hose joint portion 3a of the connector 3 is press-fitted into the end portion 1a of the resin tube 1, so that the end faces of the corresponding end portions 1a, 2b of the tubes 1, 2 remain flush with each other, as shown in FIG. 1.

The hose-connector shown in FIG. 2 may be produced in substantially the same manner as the hose-connector shown in FIG. 1, except in that an adhesive agent or layer is not used or provided for bonding together the resin tube layer and the rubber protector tube layer when the laminar tubular blank is formed. In this case, the end portions 1a, 2a of the tubes 1, 2 are more or less moved relative to each other when the hose joint portion 3a is press-fitted into each end portion 1a, so that the end face of the end portion 1a of the resin tube 1 is located axially inwardly of the end face of the end portion 2a of the rubber protector tube 2, that is, the end portion 2a extends from the end face of the end portion 1a in the direction toward the retainer portion 3b of the connector 3, as indicated in FIG. 2. Thus, the end portion 1a of the inner resin tube 1 is completely covered by the end portion 2a of the outer rubber protector tube 2. For stable protection of the end portion 1a by the end portion 2a, and for facilitating the discharging of static electricity from the resin tube 1 to the electrically conductive connector 3 through the electrically conductive rubber protector tube 2, the end portion 2a of the tube 2 is desirably held in contact with the outer circumferential surface of the hose joint portion 3a of the connector 3.

Generally, automotive vehicles use many bent or curved hoses. In the present invention, the hose 1, 2 of the hose-connector assembly is usually subjected to a bending operation before the connector 3 is attached or fixed to the hose. For instance, the bending of the hose 1, 2 may be effected by using a bending die of split type consisting of two die halves which cooperate to define a cavity having a curved configuration which corresponds to the desired bend of the hose. Initially, the intermediate portion of the hose 1, 2 is softened by heating the hose to about 80° C. and is accommodated in the bending die such that the hose is bent or curved following the curved configuration of the cavity defined by the die halves. Then, the hose is further heated to about 160° C. at which the hose is kept for about 30 minutes, for example. The hose is then cooled. Thus, the hose can be bent or curved as desired. Where the hose is bent after the connectors 3 are attached to the hose, the connectors 3 are required to be protected from heat by suitable thermally insulating means.

While the presently preferred embodiments of the invention have been described above by reference to the accompanying drawings, for illustrative purpose only, it is to be understood that the invention is not limited to the details of the illustrated embodiments, but may be embodied with various changes, modifications and improvements, which may occur to those skilled in the art, without departing from the spirit and scope of the invention defined in the following claims.

For instance, the tubular connector 3 may be fixed to only one of the opposite end portions of the hose. In this case, an end portion of a metallic pipe may be directly connected to the other end portion of the hose. The inner resin tube 1 may consist of a single layer, or a plurality of layers including a nylon layer and an ETFE layer (layer formed of a copolymer of ethylene and tetrafluoroethylene). Similarly, the outer rubber protector tube 2 may consist of a single or a plurality of layers.

What is claimed:

1. A method of producing a hose-connector assembly, comprising the steps of:

forming by extrusion an inner resin tube layer having a length sufficient to provide a plurality of inner resin tubes;

forming by extrusion an outer rubber protector tube layer on an outer circumferential surface of said inner resin tube layer, in the absence of an adhesive agent on said outer circumferential surface of said inner resin tube layer, said outer rubber protector tube layer having substantially the same length as said inner resin tube layer and comprising an unvulcanized rubber material, such that said outer circumferential surface of said inner resin tube layer is covered by said outer rubber protector tube layer over an entire length of said inner resin tube layer to obtain a laminar tubular blank comprising said inner resin tube layer and said outer rubber protector tube layer;

cutting said laminar tubular blank into pieces, each of which provides a hose comprising said inner resin tube layer and said outer rubber protector tube layer; and press-fitting one of opposite end portions of a tubular connector into each of at least one of said opposite end portions of said inner resin tube layer, such that an end portion of said outer rubber protector tube layer which overlaps said one end portion of said tubular connector extends longitudinally beyond an end face of a corresponding end portion of said inner resin tube layer in a direction toward the other end portion of said tubular connector, as a result of said step of press-fitting said one end portion of said tubular connector into each of at least one of said opposite end portions of said inner resin tube layer.

2. A method according to claim 1, further comprising a step of subjecting said unvulcanized rubber material of said outer rubber protector tube layer to a vulcanization process, before said laminar tubular blank including the vulcanized outer rubber protector tube layer is cut into pieces.

3. A method according to claim 1, further comprising a step of subjecting said unvulcanized rubber material of said outer rubber protector tube layer of each of said pieces to a vulcanization process.

4. A method according to claim 1, wherein said step of press-fitting said one of said opposite end portions of said tubular connector into each of at least one of said opposite end portions of said inner resin tube layer comprises increasing an inside diameter of each of at least one of said opposite end portions of said inner resin tube layer, before said one end portion of said tubular connector is inserted into each of at least one of said opposite end portions of said inner resin tube layer.

5. A method according to claim 1, further comprising a step of softening said hose by heating thereof and giving said hose a desired curved configuration before or after said one end portion of said tubular connector is press-fitted into each of at least one of said opposite end portions of said inner resin tube layer.

* * * * *